United States Patent
Tsuchiya

(10) Patent No.: US 12,030,609 B2
(45) Date of Patent: Jul. 9, 2024

(54) VESSEL SPEED CONTROL SYSTEM AND MARINE VESSEL

(71) Applicant: YAMAHA HATSUDOKI KABUSHIKI KAISHA, Iwata (JP)

(72) Inventor: Toshiya Tsuchiya, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 400 days.

(21) Appl. No.: 17/524,767

(22) Filed: Nov. 12, 2021

(65) Prior Publication Data
US 2022/0169355 A1 Jun. 2, 2022

(30) Foreign Application Priority Data
Dec. 2, 2020 (JP) .................. 2020-200464

(51) Int. Cl.
B63H 21/21 (2006.01)
B63H 20/00 (2006.01)
B63H 21/22 (2006.01)
G05D 1/00 (2024.01)

(52) U.S. Cl.
CPC .......... B63H 21/213 (2013.01); B63H 20/00 (2013.01); B63H 21/22 (2013.01); G05D 1/0206 (2013.01); B63H 2020/003 (2013.01); B63H 2021/216 (2013.01)

(58) Field of Classification Search
CPC ............... B63H 21/213; B63H 21/22; B63H 2021/216; B63H 20/00; B63H 2020/003; B63H 21/13; G05D 1/0206
See application file for complete search history.

(56) References Cited

U.S. PATENT DOCUMENTS

| 2002/0014193 A1* | 2/2002 | Rheault ................. | B63H 21/21 114/144 R |
| 2004/0107925 A1 | 6/2004 | Katayama | |
| 2004/0242091 A1* | 12/2004 | Okuyama ............. | B63H 21/21 440/86 |
| 2005/0273224 A1 | 12/2005 | Ito et al. | |

FOREIGN PATENT DOCUMENTS

| JP | 2004-169647 A | 6/2004 |
| JP | 2005-337016 A | 12/2005 |

* cited by examiner

*Primary Examiner* — Stephen P Avila
(74) *Attorney, Agent, or Firm* — Keating & Bennett, LLP

(57) ABSTRACT

A vessel speed control system includes a lever operator on which an operation is performed to increase or decrease a propulsion speed of the vessel, a transition operator on which a transition operation is performed to transition a normal operation mode to a speed control mode, and a controller configured or programmed to perform a control to prevent transition to the speed control mode even when the transition operation is performed on the transition operator during a restriction period of time including at least an acceleration/deceleration period of time during which a rotation speed of an engine or the propulsion speed of the vessel is changed by the lever operator in the normal operation mode.

20 Claims, 4 Drawing Sheets

VESSEL SPEED CONTROL SYSTEM AND MARINE VESSEL

CROSS REFERENCE TO RELATED APPLICATIONS

This application claims the benefit of priority to Japanese Patent Application No. 2020-200464 filed on Dec. 2, 2020. The entire contents of this application are hereby incorporated herein by reference.

BACKGROUND OF THE INVENTION

1. Field of the Invention

The present invention relates to a vessel speed control system and a marine vessel that each control a propulsion speed.

2. Description of the Related Art

A vessel speed control system and a marine vessel that each control a propulsion speed are known in general. Such a vessel speed control system and a marine vessel are disclosed in Japanese Patent Laid-Open No. 2005-337016, for example.

Japanese Patent Laid-Open No. 2005-337016 discloses a speed control device that controls movement of a water jet propelled boat at a set engine speed in a speed setting mode. The speed control device performs a control to transition a normal mode to the speed setting mode when a vessel operator performs a transition operation to press an auto cruise switch provided on the water jet propelled boat. In the normal mode, a throttle lever provided on the water jet propelled boat is operated such that the water jet propelled boat changes a propulsion speed.

Although not clearly described in Japanese Patent Laid-Open No. 2005-337016, in a speed control device as described in Japanese Patent Laid-Open No. 2005-337016, there is a phenomenon that the speed temporarily decreases (or increases) immediately after a transition operation due to the transition operation being performed while a propulsion speed is rapidly increased (or decreased) by a throttle lever. The speed control device stores the position of the throttle lever when the transition operation is performed. When the transition operation is performed during an operation to change the propulsion speed by the throttle lever, the position of the throttle lever (the position of the throttle lever stored in the speed control device) at the time of the transition operation is shifted from the actual position of the throttle lever at the time of completing the operation to change the propulsion speed such that the phenomenon described above conceivably occurs.

SUMMARY OF THE INVENTION

Preferred embodiments of the present invention provide vessel speed control systems and marine vessels that each appropriately transition to speed control modes.

A vessel speed control system according to a preferred embodiment of the present invention includes a normal operation mode to adjust a rotation speed of an engine of a propulsion device or a propulsion speed of a vessel, and a speed control mode to maintain the rotation speed of the engine or the propulsion of the vessel speed constant, and includes a lever operator on which an operation is performed to adjust a throttle opening degree of the engine to increase or decrease the propulsion speed of the vessel, a transition operator on which a transition operation is performed to transition the normal operation mode to the speed control mode, and a controller configured or programmed to perform a control to prevent transition to the speed control mode even when the transition operation is performed on the transition operator during a restriction period of time including at least an acceleration/deceleration period of time during which the rotation speed of the engine or the propulsion speed of the vessel is changed by the lever operator in the normal operation mode. The term "lever operator" indicates a concept including various operators such as a lever or a joystick including a stick-shaped operator.

A vessel speed control system according to a preferred embodiment of the present invention includes the controller configured or programmed to perform a control to prevent the transition to the speed control mode even when the transition operation is performed on the transition operator during the restriction period of time including at least the acceleration/deceleration period of time during which the rotation speed of the engine or the propulsion speed of the vessel is changed by the lever operator in the normal operation mode. Accordingly, even when the transition operation is performed on the transition operator, the transition to the speed control mode is prevented during the restriction period of time including at least the acceleration/deceleration period of time during which the rotation speed of the engine or the propulsion speed of the vessel is changed by the lever operator. Consequently, the conventional phenomenon caused by the transition operation performed while the propulsion speed is being changed is significantly reduced or prevented. Therefore, the transition to the speed control mode is appropriately performed.

In a vessel speed control system according to a preferred embodiment of the present invention, the controller is preferably configured or programmed to perform a control to transition the normal operation mode to the speed control mode when the transition operation is performed on the transition operator with the propulsion device switched from a neutral state to a forward movement state or a reverse movement state during a period of time different from the restriction period of time. Accordingly, the transition operation is performed on the transition operator with the propulsion device switched from the neutral state to the forward movement state or the reverse movement state during the period of time different from the restriction period of time such that the transition to the speed control mode is appropriately performed.

In a vessel speed control system according to a preferred embodiment of the present invention, the restriction period of time preferably includes an immediately after period of time immediately after the acceleration/deceleration period of time ends. Accordingly, unlike a case in which the transition operation is restricted only during the acceleration/deceleration period of time, the transition operation is restricted also during the immediately after period of time immediately after the acceleration/deceleration period of time ends. Consequently, the conventional phenomenon caused by the transition operation performed while the propulsion speed of the vessel is being changed is significantly reduced or prevented. Therefore, the transition to the speed control mode is more appropriately performed.

In a vessel speed control system according to a preferred embodiment of the present invention, the acceleration/deceleration period of time preferably includes an opening degree change period of time during which an operation to change the throttle opening degree is performed on the lever operator, and the controller is preferably configured or programmed to perform a control to prevent the transition to the speed control mode even when the transition operation is performed on the transition operator during the opening degree change period of time. Accordingly, when the transition operation is performed during the opening degree change period of time during which the operation to change the throttle opening degree is performed on the lever operator, the transition to the speed control mode is significantly reduced or prevented. Consequently, the transition to the speed control mode is more appropriately performed.

In such a case, the controller is preferably configured or programmed to perform a control to prevent the transition to the speed control mode even when the transition operation is performed on the transition operator during the opening degree change period of time during which an amount of operation per unit time to change the throttle opening degree on the lever operator is equal to or greater than a first threshold. Accordingly, excessive restriction of the transition operation to the speed control mode is significantly reduced or prevented. Therefore, the transition to the speed control mode is still more appropriately performed.

A vessel speed control system according to a preferred embodiment of the present invention preferably further includes a rotation speed sensor to acquire the rotation speed of the engine, the acceleration/deceleration period of time preferably includes a rotation speed change period of time during which the rotation speed of the engine acquired by the rotation speed sensor is changing, and the controller is preferably configured or programmed to perform a control to prevent the transition to the speed control mode even when the transition operation is performed on the transition operator during the rotation speed change period of time. Accordingly, when the transition operation is performed during the rotation speed change period of time during which the rotation speed of the engine acquired by the rotation speed sensor is changing, the transition to the speed control mode is significantly reduced or prevented. Consequently, the transition to the speed control mode is more appropriately performed.

In such a case, the controller is preferably configured or programmed to perform a control to prevent the transition to the speed control mode even when the transition operation is performed on the transition operator during the rotation speed change period of time during which an amount of change in the rotation speed of the engine per unit time is equal to or greater than a second threshold. Accordingly, excessive restriction of the transition operation to the speed control mode is significantly reduced or prevented. Therefore, the transition to the speed control mode is still more appropriately performed.

A vessel speed control system according to a preferred embodiment of the present invention preferably further includes a speed acquirer to acquire the propulsion speed of the vessel, the acceleration/deceleration period of time preferably includes a speed change period of time during which the propulsion speed acquired by the speed acquirer is changing, and the controller is preferably configured or programmed to perform a control to prevent the transition to the speed control mode even when the transition operation is performed on the transition operator during the speed change period of time. Accordingly, when the transition operation is performed during the speed change period of time during which the propulsion speed of the vessel acquired by the speed acquirer is changing, the transition to the speed control mode is significantly reduced or prevented. Consequently, the transition to the speed control mode is more appropriately performed.

In such a case, the controller is preferably configured or programmed to perform a control to prevent the transition to the speed control mode even when the transition operation is performed on the transition operator during the speed change period of time during which an amount of change in the propulsion speed of the vessel per unit time is equal to or greater than a third threshold. Accordingly, excessive restriction of the transition operation to the speed control mode is significantly reduced or prevented. Therefore, the transition to the speed control mode is more appropriately performed.

In a vessel speed control system including the speed acquirer, the speed acquirer preferably includes a GPS device to acquire a GPS signal, and acquires the propulsion speed of the vessel based on the GPS signal acquired by the GPS device. Accordingly, the propulsion speed of the vessel is easily acquired by the GPS device to acquire a GPS signal.

A vessel speed control system according to a preferred embodiment of the present invention preferably further includes a rotation speed sensor to acquire the rotation speed of the engine, and a speed acquirer to acquire the propulsion speed of the vessel. The acceleration/deceleration period of time preferably includes an opening degree change period of time during which an operation to change the throttle opening degree is performed on the lever operator, a rotation speed change period of time during which the rotation speed of the engine acquired by the rotation speed sensor is changing, and a speed change period of time during which the propulsion speed of the vessel acquired by the speed acquirer is changing. The controller is preferably configured or programmed to perform a control to prevent the transition to the speed control mode even when the transition operation is performed on the transition operator during the opening degree change period of time, the rotation speed change period of time, and the speed change period of time. Accordingly, when the transition operation is performed during the opening degree change period of time, the rotation speed change period of time, and the speed change period of time, the transition to the speed control mode is significantly reduced or prevented. Consequently, the transition to the speed control mode is more appropriately performed.

In a vessel speed control system according to a preferred embodiment of the present invention, the lever operator preferably includes a remote control lever on which the operation is performed to adjust the throttle opening degree of the engine to increase or decrease the propulsion speed of the vessel in the normal operation mode, and on which an operation is performed to switch a neutral state, a forward movement state, and a reverse movement state of the propulsion device in the normal operation mode. Accordingly, the transition to the speed control mode is significantly reduced or prevented while an operation is being performed on the remote control lever to adjust the throttle opening degree of the engine to increase or decrease the propulsion speed of the vessel.

In a vessel speed control system according to a preferred embodiment of the present invention, the controller is preferably configured or programmed to end the control to prevent the transition to the speed control mode even when the transition operation is performed on the transition operator when the restriction period of time ends in the normal operation mode. Accordingly, when the restriction period of time ends, the transition to the speed control mode is performed.

A marine vessel according to a preferred embodiment of the present invention includes a normal operation mode to adjust a rotation speed of an engine of a propulsion device or a propulsion speed of a marine vessel, and a speed control mode to maintain the rotation speed of the engine or the propulsion speed of the marine vessel constant, and includes a hull, the propulsion device attached to the hull, and a vessel speed control system. The vessel speed control system includes a lever operator on which an operation is performed to adjust a throttle opening degree of the engine to increase or decrease the propulsion speed of the marine vessel, a transition operator on which a transition operation is performed to transition the normal operation mode to the speed control mode, and a controller configured or programmed to perform a control to prevent transition to the speed control mode even when the transition operation is performed on the transition operator during a restriction period of time including at least an acceleration/deceleration period of time during which the rotation speed of the engine or the propulsion speed is changed by the lever operator in the normal operation mode.

A marine vessel according to a preferred embodiment of the present invention includes the controller configured or programmed to perform a control to prevent the transition to the speed control mode even when the transition operation is performed on the transition operator during the restriction period of time including at least the acceleration/deceleration period of time during which the rotation speed of the engine or the propulsion speed of the marine vessel is changed by the lever operator in the normal operation mode. Accordingly, even when the transition operation is performed on the transition operator, the transition to the speed control mode is prevented during the restriction period of time including at least the acceleration/deceleration period of time during which the rotation speed of the engine or the propulsion speed of the marine vessel is changed by the lever operator. Consequently, the conventional phenomenon caused by the transition operation performed while the propulsion speed of the marine vessel is being changed is significantly reduced or prevented. Therefore, the transition to the speed control mode is appropriately performed.

In a marine vessel according to a preferred embodiment of the present invention, the controller is preferably configured or programmed to perform a control to transition the normal operation mode to the speed control mode when the transition operation is performed on the transition operator with the propulsion device switched from a neutral state to a forward movement state or a reverse movement state during a period of time different from the restriction period of time. Accordingly, the transition operation is performed on the transition operator with the propulsion device switched from the neutral state to the forward movement state or the reverse movement state during the period of time different from the restriction period of time such that the transition to the speed control mode is appropriately performed.

In a marine vessel according to a preferred embodiment of the present invention, the restriction period of time preferably includes an immediately after period of time immediately after the acceleration/deceleration period of time ends. Accordingly, unlike a case in which the transition operation is restricted only during the acceleration/deceleration period of time, the transition operation is restricted also during the immediately after period of time immediately after the acceleration/deceleration period of time ends. Consequently, the conventional phenomenon caused by the transition operation performed while the propulsion speed of the marine vessel is being changed is significantly reduced or prevented. Therefore, the transition to the speed control mode is more appropriately performed.

In a marine vessel according to a preferred embodiment of the present invention, the acceleration/deceleration period of time preferably includes an opening degree change period of time during which an operation to change the throttle opening degree is performed on the lever operator, and the controller is preferably configured or programmed to perform a control to prevent the transition to the speed control mode even when the transition operation is performed on the transition operator during the opening degree change period of time. Accordingly, when the transition operation is performed during the opening degree change period of time during which the operation to change the throttle opening degree is performed on the lever operator, the transition to the speed control mode is significantly reduced or prevented. Consequently, the transition to the speed control mode is more appropriately performed.

In such a case, the controller is preferably configured or programmed to perform a control to prevent the transition to the speed control mode even when the transition operation is performed on the transition operator during the opening degree change period of time during which an amount of operation per unit time to change the throttle opening degree on the lever operator is equal to or greater than a threshold. Accordingly, excessive restriction of the transition operation to the speed control mode is significantly reduced or prevented. Therefore, the transition to the speed control mode is still more appropriately performed.

In a marine vessel according to a preferred embodiment of the present invention, the vessel speed control system preferably further includes a rotation speed sensor to acquire the rotation speed of the engine, the acceleration/deceleration period of time preferably includes a rotation speed change period of time during which the rotation speed of the engine acquired by the rotation speed sensor is changing, and the controller is preferably configured or programmed to perform a control to prevent the transition to the speed control mode even when the transition operation is performed on the transition operator during the rotation speed change period of time. Accordingly, when the transition operation is performed during the rotation speed change period of time during which the rotation speed of the engine acquired by the rotation speed sensor is changing, the transition to the speed control mode is significantly reduced or prevented. Consequently, the transition to the speed control mode is more appropriately performed.

In a marine vessel according to a preferred embodiment of the present invention, the vessel speed control system preferably further includes a speed acquirer to acquire the propulsion speed of the marine vessel, the acceleration/deceleration period of time preferably includes a speed change period of time during which the propulsion speed of the marine vessel acquired by the speed acquirer is changing, and the controller is preferably configured or programmed to perform a control to prevent the transition to the speed control mode even when the transition operation is performed on the transition operator during the speed change period of time. Accordingly, when the transition operation is performed during the speed change period of time during which the propulsion speed of the marine vessel acquired by the speed acquirer is changing, the transition to the speed control mode is significantly reduced or prevented. Consequently, the transition to the speed control mode is more appropriately performed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of a marine vessel 100 including a vessel speed control system 100c according to a preferred embodiment of the present invention is now described with reference to FIGS. 1 to 6. In the figures, arrow FWD represents the forward movement direction of the marine vessel 100 (front side with reference to a hull 100a), and arrow BWD represents the reverse movement direction of the marine vessel 100 (rear side with reference to the hull 100a).

Figure 1:
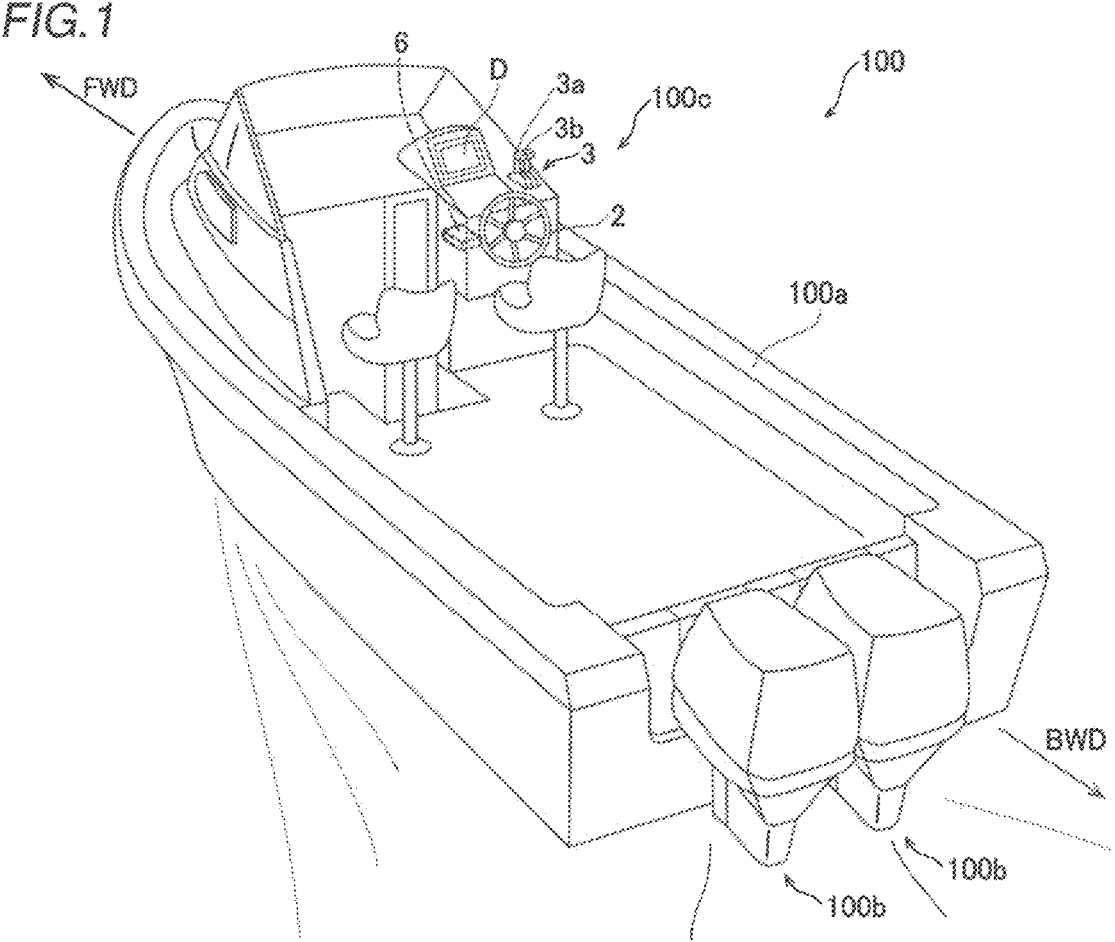
FIG. 1 is a perspective view schematically showing a marine vessel including an outboard motor and a vessel speed control system according to a preferred embodiment of the present invention.

As shown in FIG. 1, the marine vessel 100 includes the hull 100a, a plurality of (two) outboard motors 100b, and the vessel speed control system 100c. The outboard motors 100b are examples of a "propulsion device".

The plurality of outboard motors 100b are attached to a transom of the hull 100a. That is, the marine vessel 100 is an outboard motor boat including the plurality of outboard motors 100b.

Figure 2:
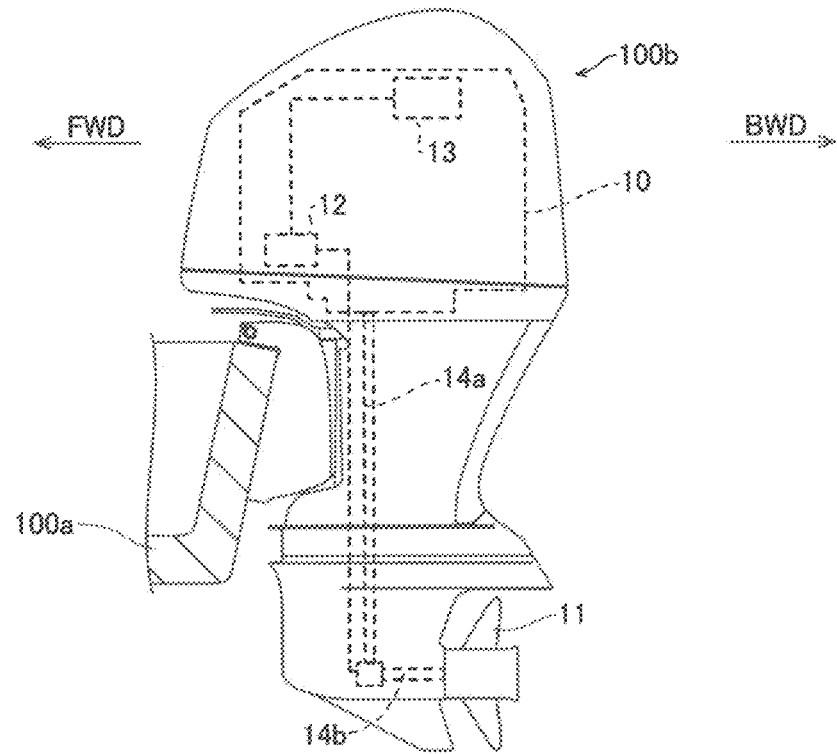
FIG. 2 is a side view illustrating the structure of an outboard motor according to a preferred embodiment of the present invention.

As shown in FIG. 2, each of the outboard motors 100b includes an engine 10, a propeller 11, a shift actuator 12, and an electronic control unit (ECU) 13. The outboard motor 100b is operated by a steering 2 such that the orientation thereof in a right-left direction is changed. Furthermore, the outboard motor 100b is operated by a remote control lever 3 such that an engine 10 rotation speed, and consequently a propulsion speed of the marine vessel 100, is changed.

The engine 10 is an internal combustion engine, for example, and generates a driving force by burning fuel and rotating a crankshaft (not shown). The engine 10 rotates the propeller 11 by the generated driving force.

The shift actuator 12 switches the shift state of the outboard motor 100b to one of a forward movement state (F), a neutral state (N), and a reverse movement state (R) based on an operation to switch the remote control lever 3 of the vessel speed control system 100c, which is described below, to one of a forward movement position FP, a neutral position NP, and a reverse movement position RP (see FIG. 4). The remote control lever 3 is an example of a "lever operator" or a "transition operator".

The "shift state" described above refers to a state in which a driving force is transmitted from a drive shaft 14a to a propeller shaft 14b. In the forward movement state (F), the propeller 11 rotates in a predetermined direction to move the hull 100a forward, in the reverse movement state (R), the propeller 11 rotates in a direction opposite to the predetermined direction to move the hull 100a rearward, and in the neutral state (N), the propeller 11 does not rotate.

The ECU 13 is a control circuit including a central processing unit (CPU) and a memory. The ECU 13 controls driving of the engine 10 and driving of the shift actuator 12 based on a command from the vessel speed control system 100c. The ECU 13 performs various drive control processes by executing programs stored in the memory.

Figure 3:
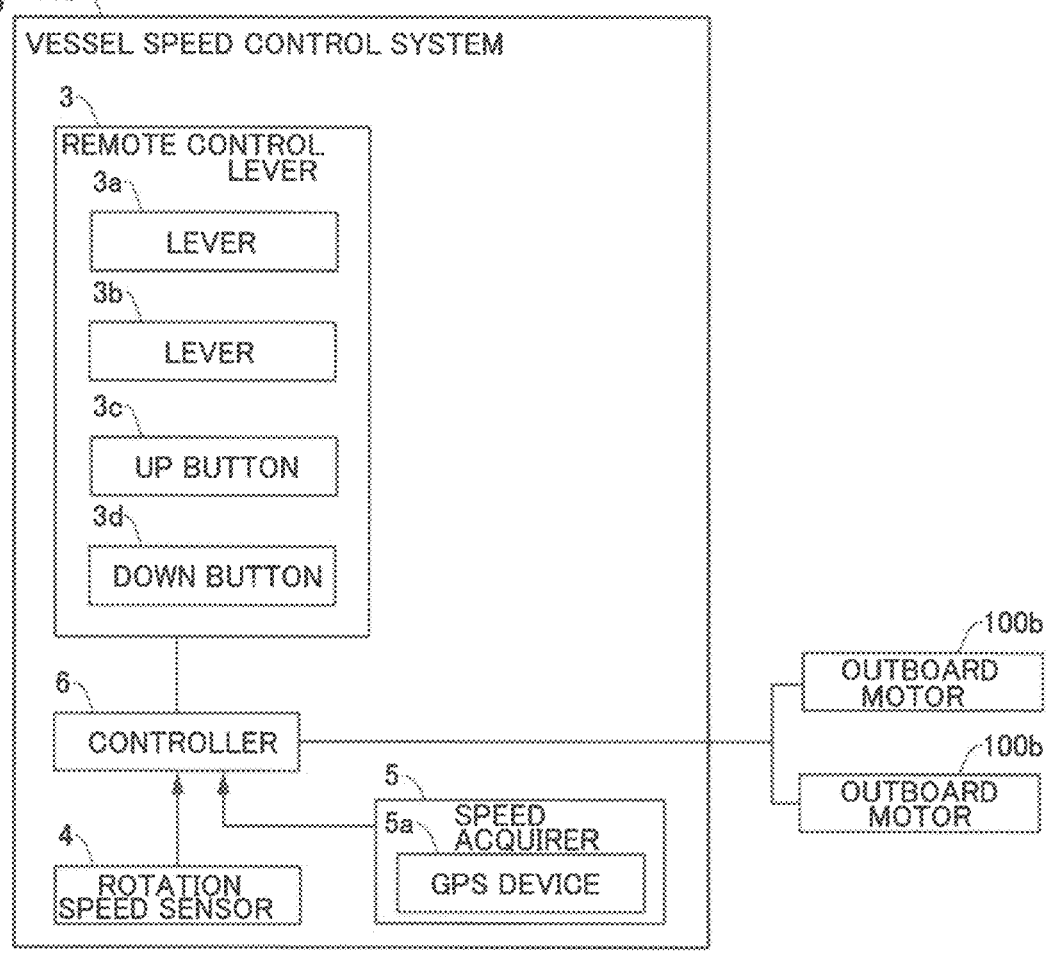
FIG. 3 is a block diagram showing the structure of a vessel speed control system and an outboard motor according to a preferred embodiment of the present invention.

As shown in FIG. 3, the vessel speed control system 100c controls the propulsion speed of the marine vessel 100 (see FIG. 1). The vessel speed control system 100c controls driving of the plurality of outboard motors 100b based on a vessel operator's operations on various operators.

The vessel speed control system 100c includes the remote control lever 3, a rotation speed sensor 4, a speed acquirer 5 including a global positioning system (GPS) device 5a, and a controller 6.

The vessel speed control system 100c includes, as a mode to control a vessel speed, a normal operation mode to adjust the rotation speed of the engine 10 of the outboard motor 100b or the propulsion speed of the marine vessel 100, and a speed control mode to maintain the rotation speed of the engine 10 or the propulsion speed of the marine vessel 100 constant.

According to preferred embodiments of the present invention, during a period of time different from a restriction period of time T (see FIG. 5) in the normal operation mode, a transition operation is performed on the remote control lever 3 with the outboard motor 100b switched from the neutral state to the forward movement state or the reverse movement state such that the controller 6 performs a control to transition the normal operation mode to the speed control mode.

As an exception, even when the transition operation is performed on the remote control lever 3 during the restriction period of time T in the normal operation mode, the controller 6 performs a control (transition restriction control) to prevent transition to the speed control mode. That is, the vessel speed control system 100c is restricted from transitioning to the speed control mode during the restriction period of time T.

An operation to adjust the throttle opening degree of the engine 10 to increase or decrease the propulsion speed of the marine vessel 100 is performed on the remote control lever 3.

Figure 4:
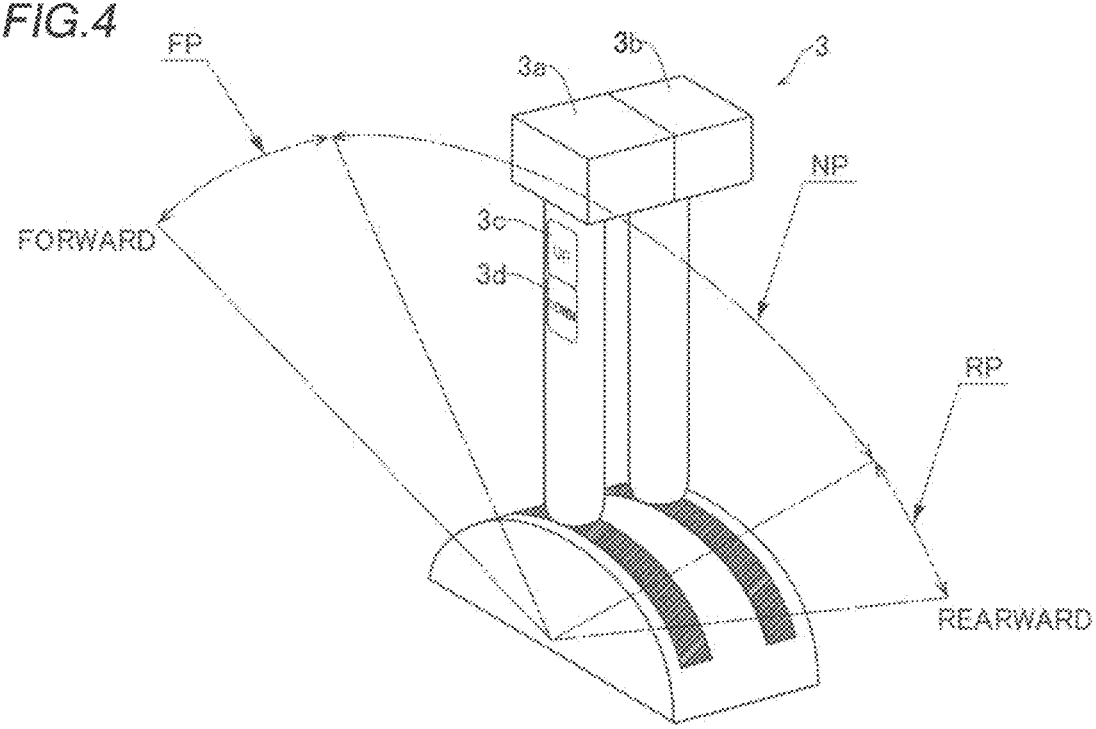
FIG. 4 is a perspective view showing a remote control lever according to a preferred embodiment of the present invention.
Figure 5:
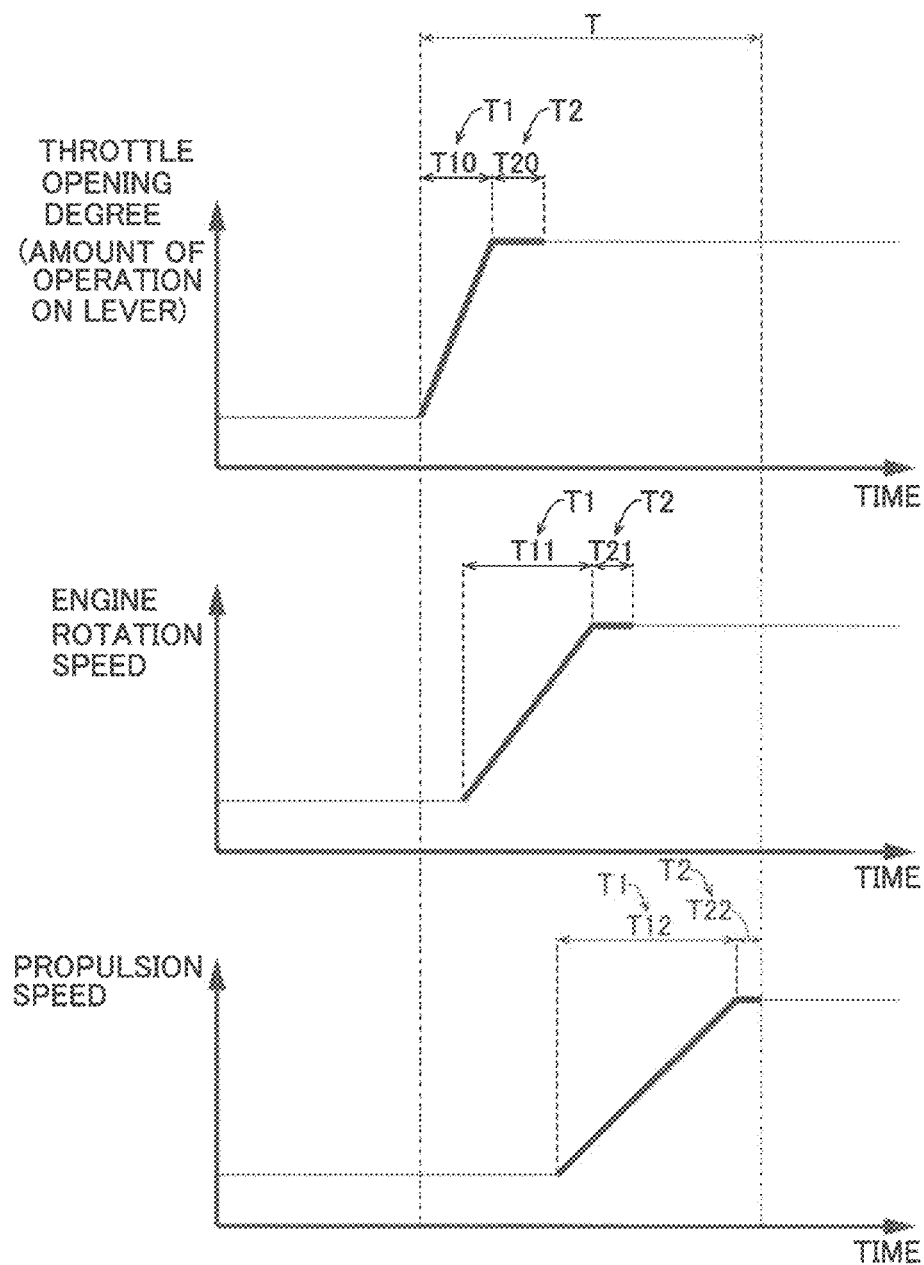
FIG. 5 is a diagram illustrating a relationship between each of a throttle opening degree, an engine rotation speed, and a propulsion speed and a restriction period of time.

As shown in FIG. 4, the remote control lever 3 includes a lever 3a to receive an operation on the port outboard motor 100b (see FIG. 3) and a lever 3b to receive an operation on the starboard outboard motor 100b.

The levers 3a and 3b are tiltable in a forward-rearward direction. That is, driving of the port and starboard outboard motors 100b is individually operated. A predetermined operation button (not shown) may be pressed such that both the port and starboard outboard motors 100b are similarly driven by one of the levers 3a and 3b of the remote control lever 3.

The remote control lever 3 switches the neutral states, the forward movement states, and the reverse movement states of the outboard motors 100b.

Specifically, the lever 3a (3b) has a range from a position tilted forward by a predetermined angle to a position tilted rearward by a predetermined angle as the neutral position NP to stop the propeller 11. The lever 3a (3b) has a range further tilted forward from the neutral position NP as the forward movement position FP to move the marine vessel 100 forward. The lever 3a (3b) has a range further tilted rearward from the neutral position NP as the reverse movement position RP to move the marine vessel 100 rearward. The remote control lever 3 switches the neutral states, the forward movement states, and the reverse movement states of the outboard motors 100b by a change in the tilt angle of the lever 3a (3b).

In each of the outboard motors 100b, the throttle opening degree of the engine 10 increases as the tilt angle of the lever 3a (3b) increases when the lever 3a is located at the forward movement position FP (reverse movement position RP).

The remote control lever 3 also includes an UP button 3c and a DOWN button 3d provided on the lever 3a.

A transition operation to transition the normal operation mode to the speed control mode is performed on the DOWN button 3d of the remote control lever 3. Specifically, the DOWN button 3d is pressed in the normal operation mode when the outboard motor 100b is in the forward or reverse movement state in order to transition the normal operation mode to the speed control mode. In the marine vessel 100, a transition operation may be performed on a dedicated transition button (not shown), for example.

The UP button 3c is pressed in a state of transition to the speed control mode such that a set value of the rotation speed of the engine 10 in the speed control mode becomes larger. The DOWN button 3d is pressed in a state of transition to the speed control mode such that the set value of the rotation speed of the engine 10 in the speed control mode becomes smaller.

The rotation speed sensor 4 shown in FIG. 3 is provided for each of the plurality of (two) outboard motors 100b, and acquires the rotation speed of the respective engine 10.

As described above, the speed acquirer 5 includes the GPS device 5a. The GPS device 5a acquires a GPS signal relating to the current position of the marine vessel 100 from a satellite. The GPS device 5a specifies the current position of the marine vessel 100 based on the acquired GPS signal. The speed acquirer 5 acquires the propulsion speed of the marine vessel 100 based on a change in the current position of the marine vessel 100 specified by the GPS device 5a.

As described above, the controller 6 performs a control (transition restriction control) to prevent transition to the speed control mode during the restriction period of time T even when the transition operation is performed on the remote control lever 3 (when the DOWN button 3d is pressed, for example).

The "control to prevent transition to the speed control mode" performed by the controller 6 may be any of a control to not receive the transition operation itself on the remote control lever 3 and a control to invalidate a predetermined signal associated with the transition operation acquired from the remote control lever 3 after the transition operation on the remote control lever 3 is received.

In the normal operation mode, the controller 6 ends the control to prevent transition to the speed control mode when the transition operation is performed on the remote control lever 3 when the restriction period of time T ends. That is, the marine vessel 100 is able to transition to the speed control mode when the restriction period of time T ends.

The restriction period of time T includes an acceleration/deceleration period of time T1 during which the rotation speed of the engine 10 or the propulsion speed of the marine vessel 100 is changed by the remote control lever 3, and an immediately after period of time T2 immediately after the acceleration/deceleration period of time T1 ends.

The acceleration/deceleration period of time T1 includes an opening degree change period of time T10, a rotation speed change period of time T11, and a speed change period of time T12.

The immediately after period of time T2 includes a first immediately after period of time T20 immediately after the opening degree change period of time T10 ends, a second immediately after period of time T21 immediately after the rotation speed change period of time T11 ends, and a third immediately after period of time T22 immediately after the speed change period of time T12 ends.

The controller 6 performs a control to prevent transition to the speed control mode even when the transition operation is performed on the remote control lever 3 during the opening degree change period of time T10. The opening degree change period of time T10 is a period of time during which an operation to change the throttle opening degree is performed on the remote control lever 3. That is, the opening degree change period of time T10 is a period of time during which the tilt angle of the lever 3a (3b) of the remote control lever 3 is changing in the forward movement state (reverse movement state).

Specifically, the opening degree change period of time T10 is a period of time during which the amount of operation per unit time to change the throttle opening degree on the remote control lever 3 is equal to or greater than a first threshold. The reason why "the amount of operation per unit time is equal to or greater than the first threshold" is to prevent the transition operation from being restricted in a state in which the remote control lever 3 is hardly operated (for the purpose of preventing chattering), for example. The "unit time" regarding the first threshold is a time (period of time) that is repeated at intervals of about several tens of milliseconds to about several hundreds of milliseconds, for example. That is, the controller 6 confirms the amount of operation on the lever 3a (3b) every unit time. The amount of operation on the lever 3a (3b) is acquired by a predetermined angle sensor (not shown) provided on the remote control lever 3. The first threshold is an example of a "threshold".

The first immediately after period of time T20 immediately after the opening degree change period of time T10 is a period of time continuous with the opening degree change period of time T10. The first immediately after period of time T20 is a period of time sufficiently shorter than the opening degree change period of time T10, and is provided to restrict the transition operation continuously for a certain period of time even after the opening degree change period of time T10 ends. After the first immediately after period of time T20 ends, the throttle opening degree does not (or barely) change.

The controller 6 performs a control to prevent transition to the speed control mode even when the transition operation is performed on the remote control lever 3 during the rotation speed change period of time T11. The rotation speed change period of time T11 is a period of time during which the rotation speed of the engine 10 acquired by the rotation speed sensor 4 is changing. That is, the rotation speed change period of time T11 is a period of time during which the rotation speed of the engine 10 is actually changing as a result of a change in the tilt angle of the lever 3a (3b).

Specifically, the rotation speed change period of time T11 is a period of time that starts after the opening degree change period of time T10 starts and ends after the opening degree change period of time T10 ends. The rotation speed change period of time T11 is a period of time that temporally overlaps at least a portion of the first immediately after period of time T20.

The rotation speed change period of time T11 is a period of time during which the amount of change in the rotation speed of the engine 10 per unit time is equal to or greater than a second threshold. The reason why "the amount of change per unit time is equal to or greater than the second threshold" is to prevent the transition operation from being restricted in a state in which the rotation speed of the engine 10 has hardly changed (for the purpose of preventing chattering), for example. The "unit time" regarding the second threshold is a time (period of time) that is repeated at intervals of about several tens of milliseconds to about several hundreds of milliseconds, for example. That is, the controller 6 confirms the amount of change in the rotation speed of the engine 10 every unit time.

The second immediately after period of time T21 immediately after the rotation speed change period of time T11 is a period of time continuous with the rotation speed change period of time T11. The second immediately after second period of time T21 is a period of time sufficiently shorter than the rotation speed change period of time T11, and is provided to restrict the transition operation continuously for a certain period of time even after the rotation speed change period of time T11 ends. After the second immediately after period of time T21 ends, the rotation speed of the engine 10 does not (or barely) change. As an example, the second immediately after period of time T21 is a period of time shorter than the first immediately after period of time T20 (T21<T20).

The controller 6 performs a control to prevent transition to the speed control mode even when the transition operation is performed on the remote control lever 3 during the speed change period of time T12. The speed change period of time T12 is a period of time during which the propulsion speed of the marine vessel 100 acquired by the speed acquirer 5 is changing. That is, the speed change period of time T12 is a period of time during which as a result of a change in the tilt angle of the lever 3a (3b), the rotation speed of the engine 10 is changing, and the propulsion speed of the marine vessel 100 is actually changing.

Specifically, the speed change period of time T12 is a period of time that starts after the rotation speed change period of time T11 starts and ends after the rotation speed change period of time T11 ends. The speed change period of time T12 is a period of time that temporally overlaps at least a portion of the second immediately after period of time T21.

The speed change period of time T12 is a period of time during which the amount of change in the propulsion speed of the marine vessel 100 per unit time is equal to or greater than a third threshold. The reason why "the amount of change per unit time is equal to or greater than the third threshold" is to prevent the transition operation from being restricted in a state in which the propulsion speed has hardly changed (for the purpose of preventing chattering), for example. The "unit time" regarding the third threshold is a time (period of time) that is repeated at intervals of about several tens of milliseconds to about several hundreds of milliseconds, for example. That is, the controller 6 confirms the amount of change in the propulsion speed every unit time.

A third immediately after period of time T22 immediately after the speed change period of time T12 is a period of time continuous with the speed change period of time T12. The third immediately after period of time T22 is a period of time sufficiently shorter than the speed change period of time T12, and is provided to restrict the transition operation continuously for a certain period of time even after the speed change period of time T12 ends. After the third immediately after period of time T22 ends, the propulsion speed does not (or barely) change. As an example, the third immediately after period of time T22 is a period of time sufficiently shorter than the second immediately after period of time T21 (T22<T21).

Figure 6:
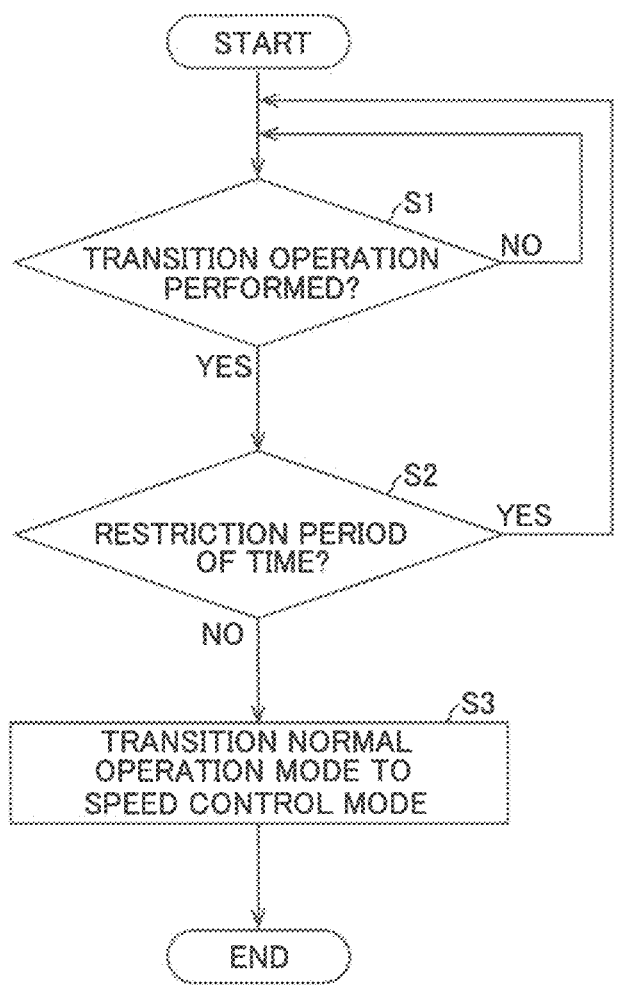
FIG. 6 is a flow diagram illustrating a transition control to transition a normal operation mode to a speed control mode and a transition restriction control to prevent transition to the speed control mode according to a preferred embodiment of the present invention.

A flow of the transition control to transition the normal operation mode to the speed control mode and the transition restriction control to prevent transition to the speed control mode performed by the controller 6 is now described with reference to FIG. 6.

In step S1, it is determined whether or not the transition operation has been performed. That is, as an example, it is determined whether or not the DOWN button 3d of the remote control lever 3 has been pressed. When it is determined that the transition operation has been performed, the process advances to step S2, and when it is determined that the transition operation has not been performed, the operation in step S1 is repeated.

Then, in step S2, it is determined whether or not the transition operation has been performed during the restriction period of time T. When it is determined that the transition operation has been performed during the restriction period of time T, the process returns to step S1, and when it is determined that the transition operation has not been performed during the restriction period of time T, the process advances to step S3.

When the process returns from step S2 to step S1 (when the transition operation is restricted), the vessel operator needs to wait for the restriction period of time T to end and perform the transition operation again after the restriction period of time T ends in order to transition the normal operation mode to the speed control mode.

When the process returns from step S2 to step S1, the marine vessel 100 may display, on a display D (see FIG. 1), for example, the predetermined contents (such as characters "during the restriction period of time of the transition operation") indicating that it is the restriction period of time T in order to cause the vessel operator to recognize that it is the restriction period of time T.

Then, in step S3, the control to transition the normal operation mode to the speed control mode is performed. Thus, the transition control to transition the normal operation mode to the speed control mode and the transition restriction control to prevent transition to the speed control mode are completed.

According to the various preferred embodiments of the present invention described above, the following advantageous effects are achieved.

According to a preferred embodiment of the present invention, the vessel speed control system 100c includes the controller 6 configured or programmed to perform a control to prevent transition to the speed control mode even when the transition operation is performed on the transition operator (remote control lever 3) during the restriction period of time T including at least the acceleration/deceleration period of time T1 during which the rotation speed of the engine 10 or the propulsion speed of the marine vessel 100 is changed by the lever operator (remote control lever 3) in the normal operation mode. Accordingly, even when the transition operation is performed on the transition operator, transition to the speed control mode is prevented during the restriction period of time T including at least the acceleration/deceleration period of time T1 during which the rotation speed of the engine 10 or the propulsion speed of the marine vessel 100 is changed by the lever operator. Consequently, the conventional phenomenon caused by the transition operation performed while the propulsion speed is being changed is significantly reduced or prevented. Therefore, transition to the speed control mode is appropriately performed.

According to a preferred embodiment of the present invention, the controller 6 is configured or programmed to perform a control to transition the normal operation mode to the speed control mode when the transition operation is performed on the transition operator (remote control lever 3) with the outboard motor 100b switched from the neutral state to the forward movement state or the reverse movement state during a period of time different from the restriction period of time T. Accordingly, the transition operation is performed on the transition operator with the outboard motor 100b switched from the neutral state to the forward movement state or the reverse movement state during the period of time different from the restriction period of time T such that transition to the speed control mode is appropriately performed.

According to a preferred embodiment of the present invention, the restriction period of time T includes the immediately after period of time T2 immediately after the acceleration/deceleration period of time T1 ends. Accordingly, unlike a case in which the transition operation is restricted only during the acceleration/deceleration period of time T1, the transition operation is restricted also during the immediately after period of time T2 immediately after the acceleration/deceleration period of time T1 ends. Consequently, the conventional phenomenon caused by the transition operation performed while the propulsion speed of the marine vessel 100 is being changed is significantly reduced or prevented. Therefore, transition to the speed control mode is more appropriately performed.

According to a preferred embodiment of the present invention, the restriction period of time T includes the opening degree change period of time T10 during which the operation to change the throttle opening degree is performed on the lever operator (remote control lever 3), as the acceleration/deceleration period of time T1, and the controller 6 is configured or programmed to perform a control to prevent transition to the speed control mode even when the transition operation is performed on the transition operator (remote control lever 3) during the opening degree change period of time T10. Accordingly, when the transition operation is performed during the opening degree change period of time T10 during which the operation to change the throttle opening degree is performed on the lever operator, transition to the speed control mode is significantly reduced or prevented. Consequently, transition to the speed control mode is more appropriately performed.

According to a preferred embodiment of the present invention, the controller 6 is configured or programmed to perform a control to prevent transition to the speed control mode even when the transition operation is performed on the transition operator (remote control lever 3) during the opening degree change period of time T10 during which the amount of operation per unit time to change the throttle opening degree on the lever operator (remote control lever 3) is equal to or greater than the first threshold. Accordingly, excessive restriction of the transition operation to the speed control mode is significantly reduced or prevented. Therefore, transition to the speed control mode is still more appropriately performed.

According to a preferred embodiment of the present invention, the vessel speed control system 100c further includes the rotation speed sensor 4 to acquire the rotation speed of the engine 10, the restriction period of time T includes the rotation speed change period of time T11 during which the rotation speed of the engine 10 acquired by the rotation speed sensor 4 is changing, as the acceleration/deceleration period of time T1, and the controller 6 is configured or programmed to perform a control to prevent transition to the speed control mode even when the transition operation is performed on the transition operator (remote control lever 3) during the rotation speed change period of time T11. Accordingly, when the transition operation is performed during the rotation speed change period of time T11 during which the rotation speed of the engine 10 acquired by the rotation speed sensor 4 is changing, transition to the speed control mode is significantly reduced or prevented. Consequently, transition to the speed control mode is more appropriately performed.

According to a preferred embodiment of the present invention, the controller 6 is configured or programmed to perform a control to prevent transition to the speed control mode even when the transition operation is performed on the transition operator (remote control lever 3) during the rotation speed change period of time T11 during which the amount of change in the rotation speed of the engine 10 per unit time is equal to or greater than the second threshold. Accordingly, excessive restriction of the transition operation to the speed control mode is significantly reduced or prevented. Therefore, transition to the speed control mode is still more appropriately performed.

According to a preferred embodiment of the present invention, the vessel speed control system 100c further includes the speed acquirer 5 to acquire the propulsion speed of the marine vessel 100, the restriction period of time T includes the speed change period of time T12 during which the propulsion speed acquired by the speed acquirer 5 is changing, as the acceleration/deceleration period of time T1, and the controller 6 is configured or programmed to perform a control to prevent transition to the speed control mode even when the transition operation is performed on the transition operator (remote control lever 3) during the speed change period of time T12. Accordingly, when the transition operation is performed during the speed change period of time T12 during which the propulsion speed of the marine vessel 100 acquired by the speed acquirer 5 is changing, transition to the speed control mode is significantly reduced or prevented. Consequently, transition to the speed control mode is more appropriately performed.

According to a preferred embodiment of the present invention, the controller 6 is configured or programmed to perform a control to prevent transition to the speed control mode even when the transition operation is performed on the transition operator (remote control lever 3) during the speed change period of time T12 during which the amount of change in the propulsion speed of the marine vessel 100 per unit time is equal to or greater than the third threshold. Accordingly, excessive restriction of the transition operation to the speed control mode is significantly reduced or prevented. Therefore, transition to the speed control mode is more appropriately performed.

According to a preferred embodiment of the present invention, the speed acquirer 5 includes the GPS device 5a to acquire a GPS signal, and acquires the propulsion speed of the marine vessel 100 based on the GPS signal acquired by the GPS device 5a. Accordingly, the propulsion speed of the marine vessel 100 is easily acquired by the GPS device 5a to acquire a GPS signal.

According to a preferred embodiment of the present invention, the vessel speed control system 100c further includes the rotation speed sensor 4 to acquire the rotation speed of the engine 10 and the speed acquirer 5 to acquire the propulsion speed of the marine vessel 100. Furthermore, the restriction period of time T includes the opening degree change period of time T10 during which an operation to change the throttle opening degree is performed on the lever operator (remote control lever 3), as the acceleration/deceleration period of time T1, the rotation speed change period of time T11 during which the rotation speed of the engine 10 acquired by the rotation speed sensor 4 is changing, as the acceleration/deceleration period of time T1, and the speed change period of time T12 during which the propulsion speed acquired by the speed acquirer 5 is changing, as the acceleration/deceleration period of time T1. Moreover, the controller 6 is configured or programmed to perform a control to prevent transition to the speed control mode even when the transition operation is performed on the transition operator during the opening degree change period of time T10, the rotation speed change period of time T11, and the speed change period of time T12. Accordingly, when the transition operation is performed during the opening degree change period of time T10, the rotation speed change period of time T11, and the speed change period of time T12, transition to the speed control mode is significantly reduced or prevented. Consequently, transition to the speed control mode is more appropriately performed.

According to a preferred embodiment of the present invention, the lever operator includes the remote control lever 3 on which an operation is performed to adjust the throttle opening degree of the engine 10 to increase or decrease the propulsion speed in the normal operation mode, and on which an operation is performed to switch the neutral state, the forward movement state, and the reverse movement state of the outboard motor 100b. Accordingly, transition to the speed control mode is significantly reduced or prevented while an operation is being performed on the remote control lever 3 to adjust the throttle opening degree of the engine 10 to increase or decrease the propulsion speed of the marine vessel 100.

According to a preferred embodiment of the present invention, the controller 6 is configured or programmed to end the control to prevent transition to the speed control mode when the transition operation is performed on the transition operator (remote control lever 3) when the restriction period of time T ends in the normal operation mode. Accordingly, when the restriction period of time T ends, transition to the speed control mode is performed.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the restriction period of time preferably includes the immediately after period of time in preferred embodiments described above, the present invention is not restricted to this. In the present invention, the restriction period of time may not include the immediately after period of time. The restriction period of time may alternatively include only some of the first immediately after period of time, the second immediately after period of time, and the third immediately after period of time. For example, the restriction period of time includes only the first immediately after period of time and the second immediately after period of time among the first immediately after period of time, the second immediately after period of time, and the third immediately after period of time.

While the restriction period of time preferably includes all of the opening degree change period of time, the rotation speed change period of time, and the speed change period of time in preferred embodiments described above, the present invention is not restricted to this. In the present invention, the restriction period of time may alternatively include only some of the opening degree change period of time, the rotation speed change period of time, and the speed change period of time, for example.

While the two outboard motors are preferably attached to the hull in preferred embodiments described above, the present invention is not restricted to this. In the present invention, one or three or more outboard motors may alternatively be attached to the hull.

While the speed acquirer preferably includes the GPS device in preferred embodiments described above, the present invention is not restricted to this. In the present invention, the speed acquirer may alternatively include a sensor to directly measure the vessel speed such as a paddle sensor instead of the GPS device, for example.

While the lever operator preferably includes the remote control lever in preferred embodiments described above, the present invention is not restricted to this. In the present invention, the lever operator may alternatively include another operator such as a joystick.

While the transition operator preferably includes the remote control lever in preferred embodiments described above, the present invention is not restricted to this. In the present invention, the transition operator may alternatively include another operator such as an attached operating panel.

While in the vessel speed control system, two operations including an operation to adjust the throttle opening degree of the engine to increase or decrease the propulsion speed and a transition operation to transition the normal operation mode to the speed control mode are preferably performed on the common operator (remote control lever) in preferred embodiments described above, the present invention is not restricted to this. In the present invention, in the vessel speed control system, the two operations described above may alternatively be performed on different operators, respectively.

While the marine vessel including the vessel speed control system is preferably an outboard motor boat in preferred embodiments described above, the present invention is not restricted to this. In the present invention, the marine vessel including the vessel speed control system may alternatively be a jet propelled boat, for example.

While the process operations performed by the controller are described using a flowchart in a flow-driven manner in which processes are performed in order along a process flow for the convenience of illustration in preferred embodiments described above, the present invention is not restricted to this. In the present invention, the process operations performed by the controller may alternatively be performed in an event-driven manner in which the processes are performed on an event basis. In this case, the process operations performed by the controller may be performed in a complete event-driven manner or in a combination of an event-driven manner and a flow-driven manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel speed control system including a normal operation mode to adjust a rotation speed of an engine of a propulsion device or a propulsion speed of a vessel, and a speed control mode to maintain the rotation speed of the engine or the propulsion speed of the vessel constant, the vessel speed control system comprising:
   a lever operator on which an operation is performed to adjust a throttle opening degree of the engine to increase or decrease the propulsion speed of the vessel;
   a transition operator on which a transition operation is performed to transition the normal operation mode to the speed control mode; and
   a controller configured or programmed to perform a control to prevent transition to the speed control mode even when the transition operation is performed on the transition operator during a restriction period of time including at least an acceleration/deceleration period of time during which the rotation speed of the engine or the propulsion speed of the vessel is changed by the lever operator in the normal operation mode; wherein
   the controller is configured or programmed to perform a control to transition the normal operation mode to the speed control mode when the transition operation is performed on the transition operator with the propulsion device switched from a neutral state to a forward movement state or a reverse movement state during a period of time different from the restriction period of time.

2. The vessel speed control system according to claim 1, wherein the restriction period of time includes an immediately after period of time immediately after the acceleration/deceleration period of time ends.

3. The vessel speed control system according to claim 1, wherein
   the acceleration/deceleration period of time includes an opening degree change period of time during which an operation to change the throttle opening degree is performed on the lever operator; and
   the controller is configured or programmed to perform a control to prevent the transition to the speed control mode even when the transition operation is performed on the transition operator during the opening degree change period of time.

4. The vessel speed control system according to claim 3, wherein the controller is configured or programmed to perform a control to prevent the transition to the speed control mode even when the transition operation is performed on the transition operator during the opening degree change period of time during which an amount of operation per unit time to change the throttle opening degree on the lever operator is equal to or greater than a first threshold.

5. The vessel speed control system according to claim 1, further comprising:
   a rotation speed sensor to acquire the rotation speed of the engine; wherein
   the acceleration/deceleration period of time includes a rotation speed change period of time during which the rotation speed of the engine acquired by the rotation speed sensor is changing; and
   the controller is configured or programmed to perform a control to prevent the transition to the speed control mode even when the transition operation is performed on the transition operator during the rotation speed change period of time.

6. The vessel speed control system according to claim 5, wherein the controller is configured or programmed to perform a control to prevent the transition to the speed control mode even when the transition operation is performed on the transition operator during the rotation speed change period of time during which an amount of change in the rotation speed of the engine per unit time is equal to or greater than a second threshold.

7. The vessel speed control system according to claim 1, further comprising:
   a speed acquirer to acquire the propulsion speed of the vessel; wherein
   the acceleration/deceleration period of time includes a speed change period of time during which the propulsion speed of the vessel acquired by the speed acquirer is changing; and
   the controller is configured or programmed to perform a control to prevent the transition to the speed control mode even when the transition operation is performed on the transition operator during the speed change period of time.

8. The vessel speed control system according to claim 7, wherein the controller is configured or programmed to perform a control to prevent the transition to the speed control mode even when the transition operation is performed on the transition operator during the speed change period of time during which an amount of change in the propulsion speed of the vessel per unit time is equal to or greater than a third threshold.

9. The vessel speed control system according to claim 7, wherein the speed acquirer includes a GPS device to acquire a GPS signal, and to acquire the propulsion speed of the vessel based on the GPS signal acquired by the GPS device.

10. The vessel speed control system according to claim 1, further comprising:
    a rotation speed sensor to acquire the rotation speed of the engine; and
    a speed acquirer to acquire the propulsion speed of the vessel; wherein
    the acceleration/deceleration period of time includes an opening degree change period of time during which an operation to change the throttle opening degree is performed on the lever operator, a rotation speed change period of time during which the rotation speed of the engine acquired by the rotation speed sensor is changing, and a speed change period of time during which the propulsion speed of the vessel acquired by the speed acquirer is changing; and
    the controller is configured or programmed to perform a control to prevent the transition to the speed control mode even when the transition operation is performed on the transition operator during the opening degree change period of time, the rotation speed change period of time, and the speed change period of time.

11. The vessel speed control system according to claim 1, wherein the lever operator includes a remote control lever on which the operation is performed to adjust the throttle opening degree of the engine to increase or decrease the propulsion speed of the vessel in the normal operation mode, and on which an operation is performed to switch the neutral state, the forward movement state, and the reverse movement state of the propulsion device in the normal operation mode.

12. The vessel speed control system according to claim 1, wherein the controller is configured or programmed to end the control to prevent the transition to the speed control mode even when the transition operation is performed on the transition operator when the restriction period of time ends in the normal operation mode.

13. A marine vessel including a normal operation mode to adjust a rotation speed of an engine of a propulsion device or a propulsion speed of the marine vessel, and a speed control mode to maintain the rotation speed of the engine or the propulsion speed of the marine vessel constant, the marine vessel comprising:
   a hull;
   the propulsion device attached to the hull; and
   a vessel speed control system including:
      a lever operator on which an operation is performed to adjust a throttle opening degree of the engine to increase or decrease the propulsion speed of the marine vessel;
      a transition operator on which a transition operation is performed to transition the normal operation mode to the speed control mode; and
      a controller configured or programmed to perform a control to prevent transition to the speed control mode even when the transition operation is performed on the transition operator during a restriction period of time including at least an acceleration/deceleration period of time during which the rotation speed of the engine or the propulsion speed of the marine vessel is changed by the lever operator in the normal operation mode; wherein
   the controller is configured or programmed to perform a control to transition the normal operation mode to the speed control mode when the transition operation is performed on the transition operator with the propulsion device switched from a neutral state to a forward movement state or a reverse movement state during a period of time different from the restriction period of time.

14. The marine vessel according to claim 13, wherein the restriction period of time includes an immediately after period of time immediately after the acceleration/deceleration period of time ends.

15. The marine vessel according to claim 13, wherein
   the acceleration/deceleration period of time includes an opening degree change period of time during which an operation to change the throttle opening degree is performed on the lever operator; and
   the controller is configured or programmed to perform a control to prevent the transition to the speed control mode even when the transition operation is performed on the transition operator during the opening degree change period of time.

16. The marine vessel according to claim 15, wherein the controller is configured or programmed to perform a control to prevent the transition to the speed control mode even when the transition operation is performed on the transition operator during the opening degree change period of time during which an amount of operation per unit time to change the throttle opening degree on the lever operator is equal to or greater than a threshold.

17. The marine vessel according to claim 13, wherein
   the vessel speed control system further includes a rotation speed sensor to acquire the rotation speed of the engine;
   the acceleration/deceleration period of time includes a rotation speed change period of time during which the rotation speed of the engine acquired by the rotation speed sensor is changing; and
   the controller is configured or programmed to perform a control to prevent the transition to the speed control mode even when the transition operation is performed on the transition operator during the rotation speed change period of time.

18. The marine vessel according to claim 13, wherein
   the vessel speed control system further includes a speed acquirer to acquire the propulsion speed of the marine vessel;
   the acceleration/deceleration period of time includes a speed change period of time during which the propulsion speed of the marine vessel acquired by the speed acquirer is changing; and
   the controller is configured or programmed to perform a control to prevent the transition to the speed control mode even when the transition operation is performed on the transition operator during the speed change period of time.

19. A vessel speed control system including a normal operation mode to adjust a rotation speed of an engine of a propulsion device or a propulsion speed of a vessel, and a speed control mode to maintain the rotation speed of the engine or the propulsion speed of the vessel constant, the vessel speed control system comprising:
   a lever operator on which an operation is performed to adjust a throttle opening degree of the engine to increase or decrease the propulsion speed of the vessel;
   a transition operator on which a transition operation is performed to transition the normal operation mode to the speed control mode; and
   a controller configured or programmed to perform a control to prevent transition to the speed control mode even when the transition operation is performed on the transition operator during a restriction period of time including at least an acceleration/deceleration period of time during which the rotation speed of the engine or the propulsion speed of the vessel is changed by the lever operator in the normal operation mode; wherein
   the restriction period of time includes an immediately after period of time immediately after the acceleration/deceleration period of time ends.

20. A marine vessel including a normal operation mode to adjust a rotation speed of an engine of a propulsion device or a propulsion speed of the marine vessel, and a speed control mode to maintain the rotation speed of the engine or the propulsion speed of the marine vessel constant, the marine vessel comprising:
   a hull;
   the propulsion device attached to the hull; and
   a vessel speed control system including:
      a lever operator on which an operation is performed to adjust a throttle opening degree of the engine to increase or decrease the propulsion speed of the marine vessel;
      a transition operator on which a transition operation is performed to transition the normal operation mode to the speed control mode; and
      a controller configured or programmed to perform a control to prevent transition to the speed control mode even when the transition operation is performed on the transition operator during a restriction period of time including at least an acceleration/deceleration period of time during which the rotation speed of the engine or the propulsion speed of the marine vessel is changed by the lever operator in the normal operation mode; wherein the restriction period of time includes an immediately after period of time immediately after the acceleration/deceleration period of time ends.

* * * * *